Jan. 23, 1962   L. B. WALLERSTEIN   3,018,355
APPARATUS FOR SHAPING AND CUTTING PLASTIC MATERIALS
Filed Jan. 2, 1958   7 Sheets-Sheet 1
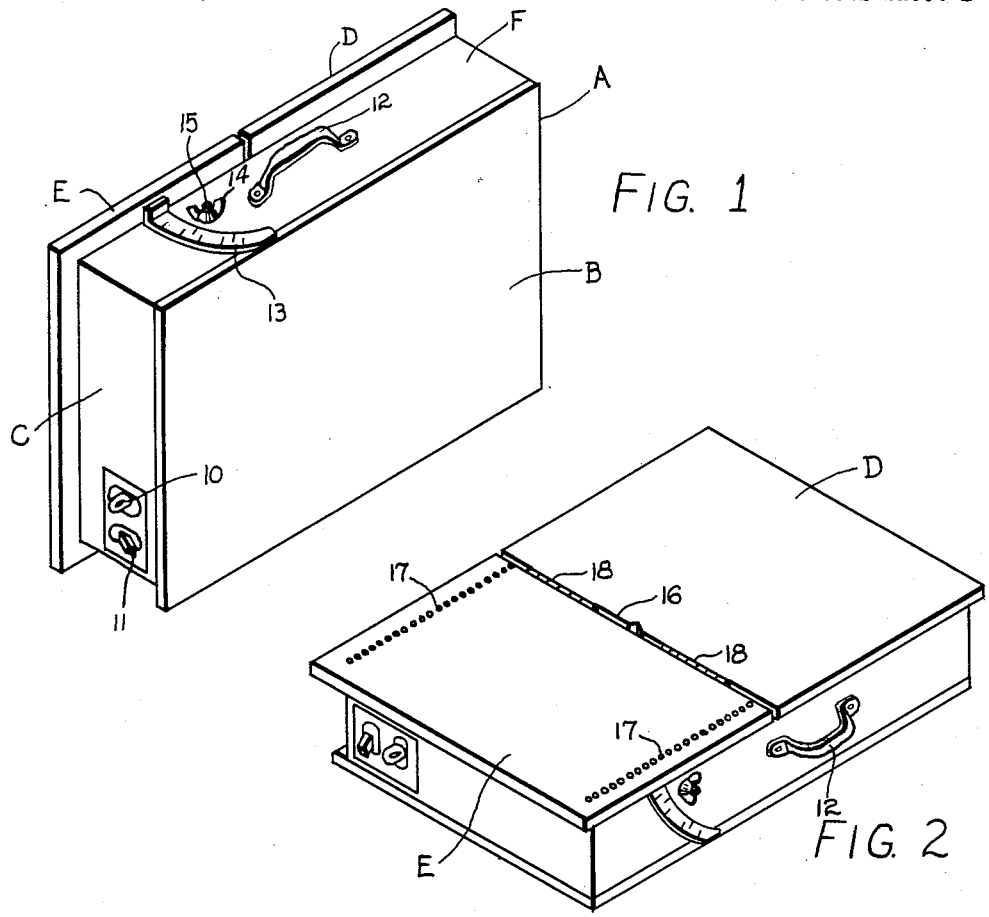
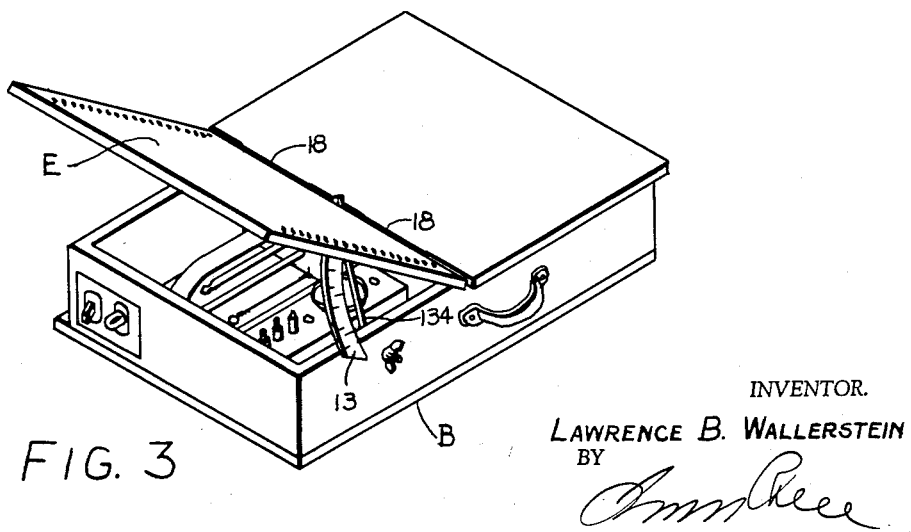
INVENTOR.
LAWRENCE B. WALLERSTEIN
BY Jan. 23, 1962    L. B. WALLERSTEIN    3,018,355
APPARATUS FOR SHAPING AND CUTTING PLASTIC MATERIALS
Filed Jan. 2, 1958    7 Sheets-Sheet 2

INVENTOR.
LAWRENCE B. WALLERSTEIN
BY

INVENTOR.
LAWRENCE B. WALLERSTEIN

Jan. 23, 1962 L. B. WALLERSTEIN 3,018,355
APPARATUS FOR SHAPING AND CUTTING PLASTIC MATERIALS
Filed Jan. 2, 1958 7 Sheets-Sheet 4

INVENTOR.
LAWRENCE B. WALLERSTEIN
BY

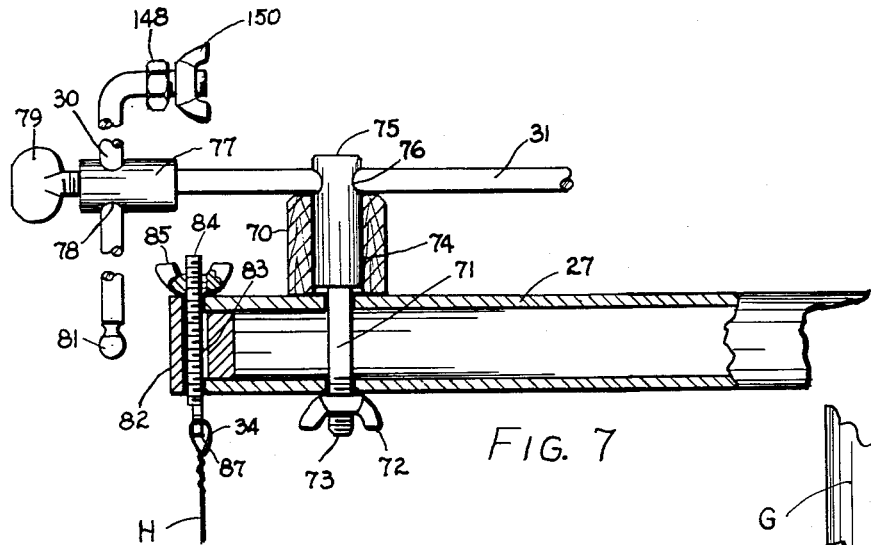
FIG. 7
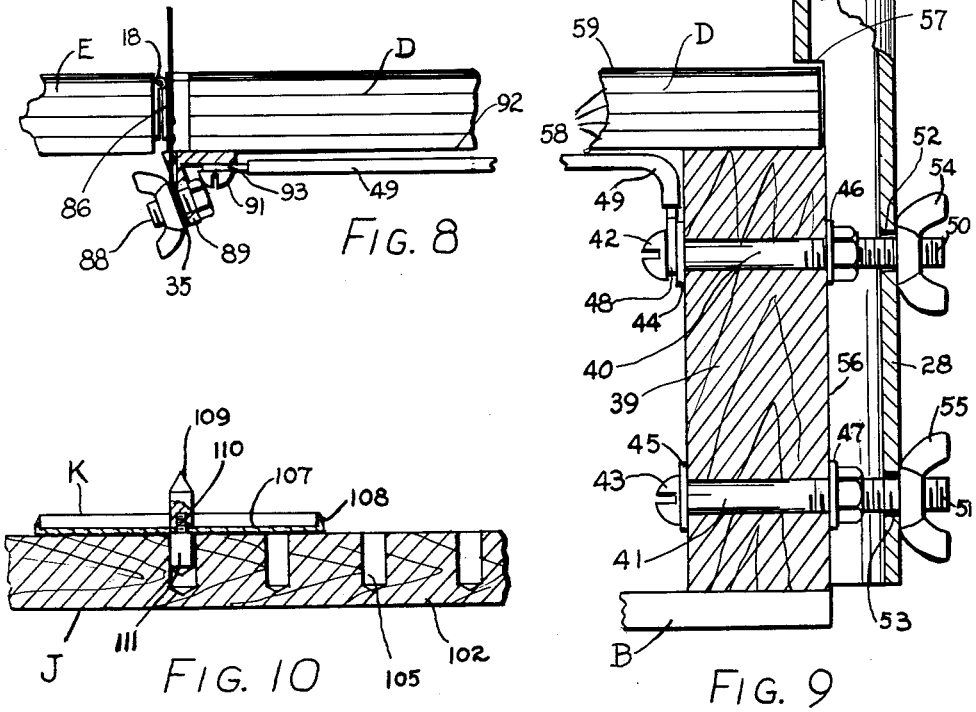
FIG. 8
FIG. 9
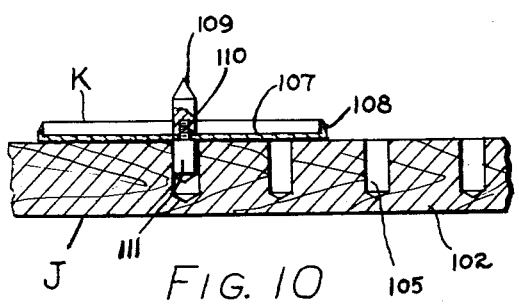
FIG. 10
INVENTOR.
LAWRENCE B. WALLERSTEIN
BY

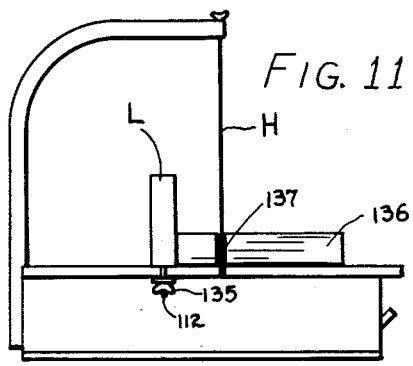
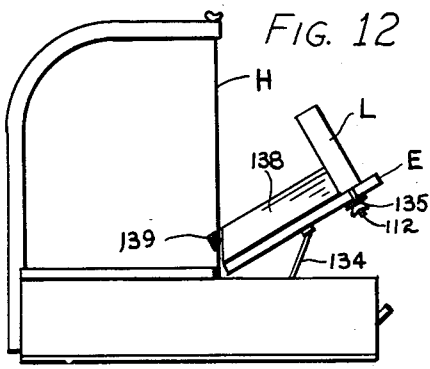
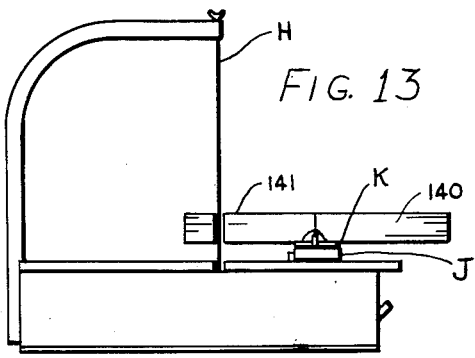
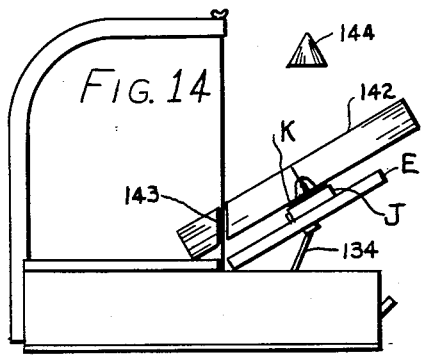
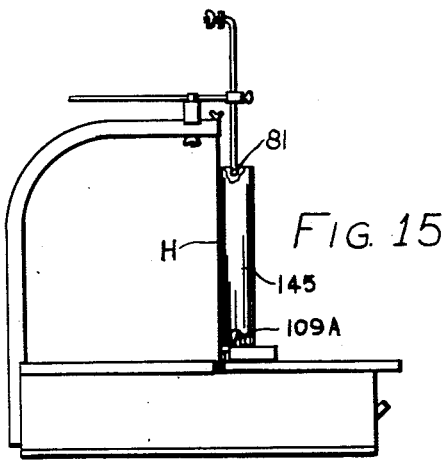
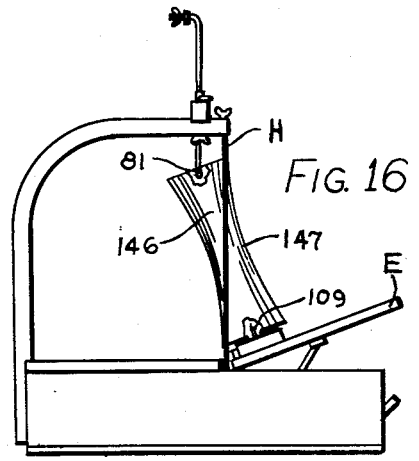

Jan. 23, 1962     L. B. WALLERSTEIN     3,018,355
APPARATUS FOR SHAPING AND CUTTING PLASTIC MATERIALS
Filed Jan. 2, 1958     7 Sheets-Sheet 7

INVENTOR.
LAWRENCE B. WALLERSTEIN
BY

United States Patent Office  3,018,355
Patented Jan. 23, 1962

3,018,355
APPARATUS FOR SHAPING AND CUTTING PLASTIC MATERIALS
Lawrence B. Wallerstein, 87 Daisy Farms Road, New Rochelle, N.Y.
Filed Jan. 2, 1958, Ser. No. 706,662
14 Claims. (Cl. 219—19)

The present invention relates to a method and apparatus for cutting and shaping plastic materials.

Although the present invention will be particularly described in connection with its application to the shaping and cutting of foam-like or porous plastic materials, such as porous styrene, and particularly the form of porous styrene known commercially as Styrofoam, it has a broad application to the cutting of plastic materials and other materials in general which may be severed or shaped by means of a hot elongated cutting element or hot elongated cutting wire.

It is among the objects of the present invention to provide a simple compact portable inexpensive and reliable apparatus of the character described, which may be readily shipped, stored or carried from place to place, and which may be readily set up to enable the shaping and cutting of foam plastic materials and particularly foam styrene materials.

Another object is to provide a cutting procedure and method which will permit a wide variety of shapes and forms to be accurately produced and reproduced from porous styrene materials, with relatively simple manipulations and by relatively simple attachments without involving special training or technical skill and which would be available to the manufacturer or maker of displays, mountings and other objects which are to be shaped out of foam plastic materials.

A further object of the present invention is to enable an apparatus which will permit various types of round or straight cuts without involving free manual cutting operations and which will give assurance that symmetrical forms of a wide variety of shapes, sizes and curvatures may be readily produced with a minimum waste of material and with maximum efficiency and at a high production rate.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it has been found most satisfactory to mount the entire apparatus in a rectangular carrying case, the enclosure of which will carry the necessary equipment in readily accessible position, together with the electrical connections.

The top of the table will have a fixed platen or table member and also an upwardly swinging inclined table member, the adjustment of which may be varied in accordance with the inclination of the cut and the shape and size of the object to be formed. Conveniently mounted upon the table is an arm member which may carry the upper end of a cutting element, such as a cutting wire, with the lower end being mounted interiorly of the table and extending between the fixed platen or table element and the swinging platen or table element, and being fastened to an inclined stud terminal.

The table or platens are so arranged and provided with calibrated space openings so that various transverse guide members may be mounted at predetermined positions thereon to give the desired thickness of cut or the desired spacing and size of the cut plastic article.

Cross members carrying pivotal mountings may be provided to enable rotation of the plastic porous masses when being shaped and cut, and electrical connections may be provided so as to give a long suspension to the cutting wire or a short suspension which would create a higher temperature in the cutting element or wire so as to obtain a more rapid rate of cutting.

If desired, instead of a straight wire, it is also possible to utilize various shapes of wires or cutting elements which will give desired form to the porous plastic mass when it is either moved longitudinally, or rotatably, or in any irregular path in contact with the hot cutting member. The various shapes of wires or cutting elements may also be utilized with the inclinable platen in an inclined plane relative to the fixed platen.

The apparatus may be rapidly assembled or disassembled and stored in the case without the use of any tools.

The case and platens are of wood and plastic construction and easily insulate the low voltage output of the transformer secondary circuit as applied to the cutting element. In one preferred form of the invention, the secondary output is limited to 5 volts.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 1 is a side perspective view of the complete carrying case, with the equipment enclosed in the position in which it may be carried from place to place or stored or shipped.

FIG. 2 is a top perspective view of the carrying case when lowered upon a horizontal supporting surface preparatory to being set up.

FIG. 3 is a top perspective view similar to FIG. 2, showing the case as it is about to be set up, with the cover element being lifted.

FIG. 7 is a transverse vertical sectional view taken upon the line 7—7 of FIG. 6, upon an enlarged scale as compared to FIG. 6, showing the upper wire connection.

FIG. 8 is a transverse vertical sectional view taken upon the line 8—8 of FIG. 6, upon an enlarged scale as compared to FIG. 6, showing the lower wire connection.

FIG. 9 is a transverse vertical sectional view taken upon the line 9—9 of FIG. 5, upon an enlarged scale as compared to FIG. 5, showing the mounting of the upper connecting arm for the cutting wire.

FIG. 10 is a transverse vertical sectional view taken upon the line 10—10 of FIG. 6, showing the rotating mount device, and upon an enlarged scale as compared to FIG. 6.

Figure 6:
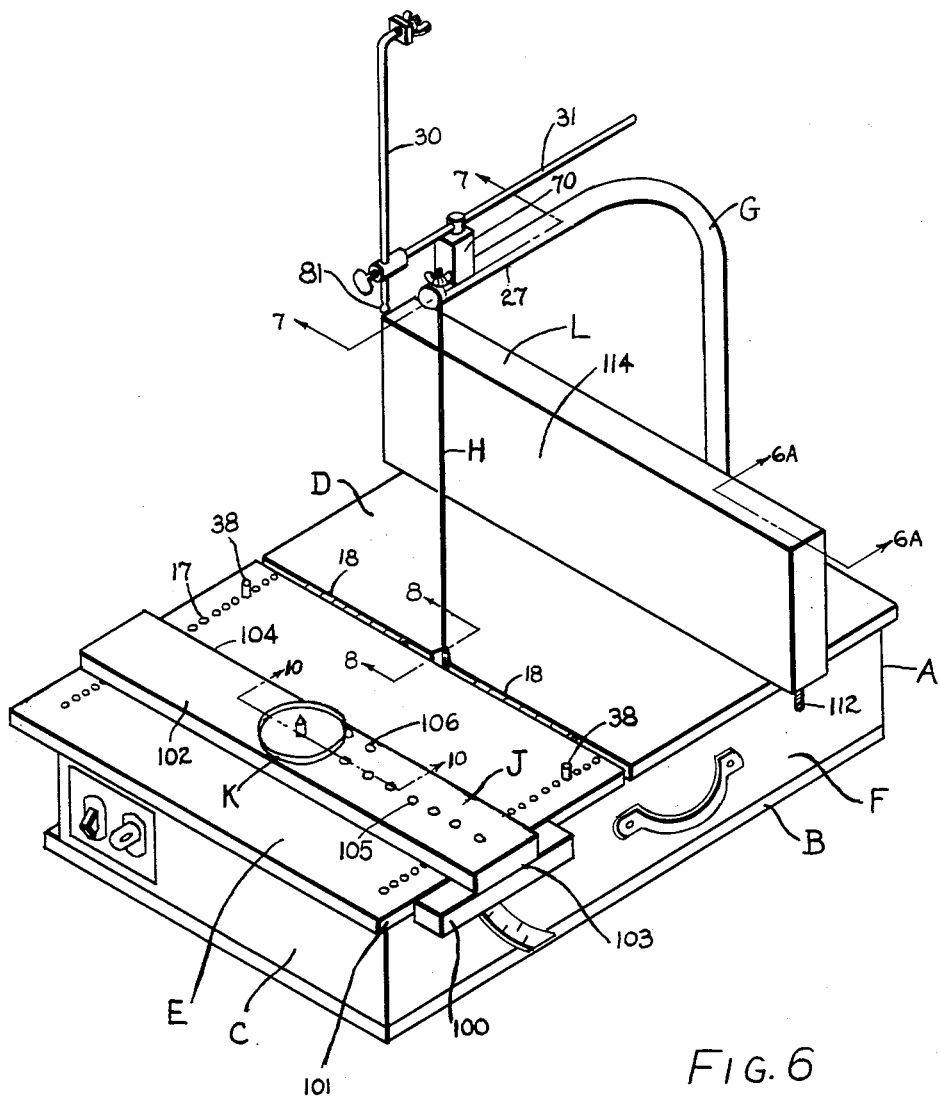
FIG. 6 is a top perspective view showing the equipment set up so that it may be readily applied to shaping or sizing various objects from porous plastic material.
Figure 4A:
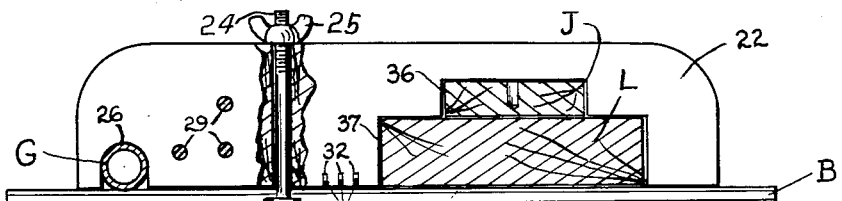
FIG. 4A is a fragmentary transverse sectional view upon the line 4A—4A of FIG. 4 upon an enlarged scale as compared to FIG. 4.
Figure 4B:
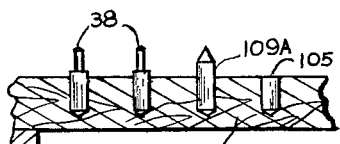
FIG. 4B is a fragmentary transverse vertical sectional view taken upon the line 4B—4B of FIG. 4 upon an enlarged scale as compared to FIG. 4.

FIGS. 11 to 20 respectively are diagrammatic side elevational views indicating the location of the equipment, as shown in FIG. 6, so as to achieve various forms of cuts and shapes, which are to be given to the porous styrene material.

Figure 20:
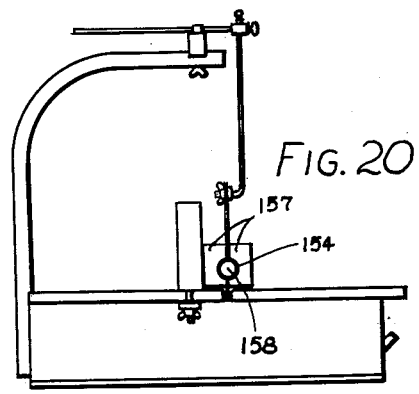
Figure 21:
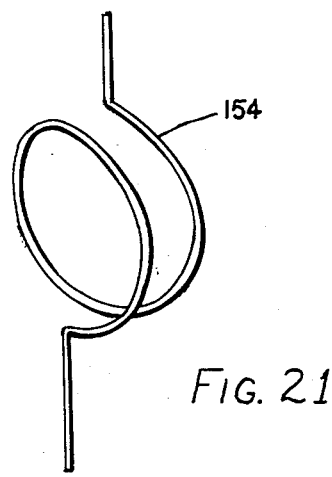

FIG. 21 is a fragmentary perspective view showing the shape of a preformed wire to give the cut as illustrated in FIG. 20.

Referring to FIGS. 1 to 6, there is shown a carrying case A having a base or bottom plate B, a front wall C, a fixed platen or table top D and a swinging platen or table top E.

Referring to FIG. 1, the front wall C is provided with a light 10, indicating when the device is on, and also a main switch 11.

The side wall F, which is the top wall in carrying position, is provided with a handle 12 and an arcuate member 13 which is graduated to be able to determine the amount of elevation of the swinging table arrangement or platen element E. The thumb nut 14 on the screw 15 will enable fixing of the swinging element E in any elevated angular position.

Referring to FIG. 2, the swinging table element E is hingedly connected at the slot 16 by the hinges 18 to the fixed table element or platen D, and at its sides it is provided with a series of openings 17 of predetermined spacing to enable the insertion of dowels or stop pins to permit predetermined location of transverse guide members.

Figure 4:
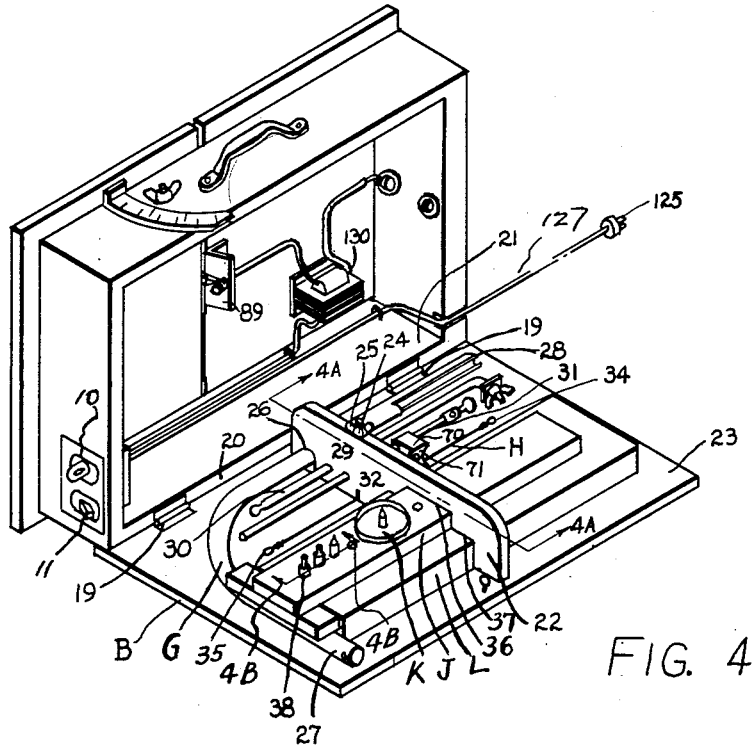
FIG. 4 is a side perspective view showing the upper housing lifted to give access to the hinged bottom element upon which the various tools and elements are mounted and are readily available.

In FIG. 3 the swinging member E is shown as partly elevated, permitting access to the equipment mounted on the bottom plate or base B, which equipment is best shown with the bottom in open position, as indicated in FIG. 4. It will be noted that the bottom B is hingedly connected at 19 to the lower edge 20 of the wall 21 of the casing A.

Another purpose of partially elevating the member E in FIG. 3 is to permit access to the interiorly located latching device, not shown, to permit full opening of the case as shown in FIG. 4.

By means of the keeper board 22 the various elements and parts are kept in dismantled condition upon the inside face 23 of the base bottom B when not in use.

The structure or cross board 22 is held down by means of the bolt 24 and the thumb nut 25. This cross board 22 has a recess at 26 which holds down the right angular curved main support element G. This support element G is of tubular construction, and it has an upper straight tubular member 27 and a lower tubular portion 28 which has been cut in half for mounting when installed in operative position.

The cross board 22 also has the recesses 29 to receive the rods 30 and 31, which are respectively used for an upper centering bearing member and a carrier for said centering bearing member respectively as well as a conducting support during certain operations, as shown in views 17 through 20.

There is also a slot 32 in which may be positioned the cutting wires H having the looped ends 34 and 35.

The recesses 36 and 37 are designed to carry the cross board J with a series of dowels or locator plugs 38 as well as the rotary mount member K. The recess 37 carries the transverse locator board L, which may be positioned upon the table also to locate the position of the cut.

Other equipment may be similarly stored upon the face 23 of the base B.

FIG. 6 shows the various elements being held in assembled position as they are mounted upon the table when the device is set up for operation. The right angular arm G in FIG. 5 has been set up with its lower end mounted to the rear of the carrying case A.

This is best shown in FIG. 9, and it will be noted that the half tubular portion 28 of the right angular tubular member G is held in position on the rear wall 39 by the through bolts 40 and 41, which have the fillister heads 42 and 43 and washers 44 and 45, with the nut and washer elements 46 and 47 clamping bolts in position upon the wall 39. Between the head 42 and the washer 44 is clamped the eye 48, which leads to the electrical connection 49. The threaded extensions 50 and 51 will extend through the openings 52 and 53 in the portion 28.

The thumb nuts 54 and 55 will clamp the half round portion 28 against the rear face 56 of the wall 39. The shoulder 57 will hold the tubular member G in position in respect to the table element D.

The table elements D and E are made up of laminated board, as indicated at 58, with a plastic facing 59 to give a finished effect. The plastic facing also provides a surface of low co-efficient of friction which facilitates movement of the formed styrene on the surface.

Referring to FIG. 6, the arm G at its upper end 27 will carry the block 70, which as shown in FIG. 4 has a recessed rounded portion 71 to fit and contact closely the top rounded face of the portion 27 of the tube G. This block is held in position in the manner shown in FIG. 7 by the bolt 71 extending through the tubular member, with the thumb nut 72 on its lower threaded end 73. The block has a central passage 74 in which fits the enlargement 75.

The enlargement 75 has a through opening 76 at the end projecting above the block 70 through which the rod 31 passes.

At the end of the rod 31 there is an enlarged head 77 having a through opening 78, through which projects the centering or upper pivot element 30. This upper pivot element 30 is held in a fixed adjusted position by the thumb screw 79.

The lower stylus 81 may be adjusted to fit into the top of an object which is to be rotated in contact with the hot wire.

The end plug 82 will block off the tube 27. Positioned in hole 83 in the end plug 82 is the screw 84 capable of being positioned upwardly or downwardly by means of the thumb nut 85, which carries the loop 34 by the hook 87. The hook 87 will provide the desired tension on the hot cutting wire H. Screw 84 is flattened on one side to prevent rotation when thumb nut 85 is turned.

The hot cutting wire at 86 will pass downwardly through the hinged slot 16 between the table elements E and D, and it will be engaged in by its lower loop 35 on the projection 88 on the angle plate 89. Wire 86 is centered in the notch on angle plate 89; the notch is best shown on FIG. 4. This angle plate 89 is held by the screws 90 and 91 on the bottom face 92 of the fixed table element D.

The screw 91 will hold in position and establish a connection to the eye 93 of the electrical conductor 49.

Referring to FIG. 6, the cross member J, which carries the rotary device K, has a T square head 100 which rides along the face 101 of the swinging table element E.

The main section of the T 102 overlaps the head 100 at 103 and is held thereto by screws or nails not shown. The cross board 102 may be correctly positioned by inserting the dowels or stop pins 38 in a desired position in the openings 17 and then moving the edge 104 to contact the dowels 38 on each side.

It will be noted that the board 102 has a row of central openings 105 and a parallel row 106 which form alternate positions for the rotary device K.

The rotary device K, as best shown in FIG. 10, has a plate member 107, with the upstanding flange 108, which can bite into the plastic material, and a central upstanding stylus 109. The central stylus 109 is mounted upon the threaded reduced diameter projection 110 of the lower pivotal stud 111, which projects up through the base 107. By means of the stylus 109 and the fact that the plate 107 may be rotated on the stud 111, it is possible to rotate the block of porous material through the hot wire H during the cutting operation, and the adjustment of the radius may take place by moving the element K along the openings 106 and 105 on the board 102.

Figure 6A:
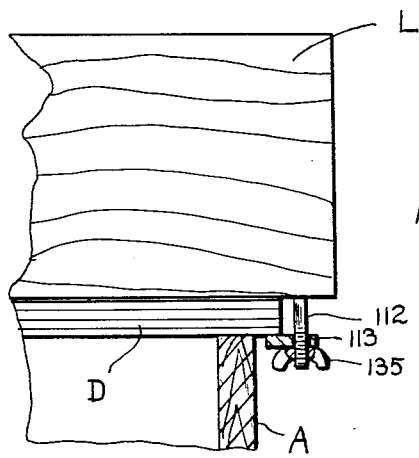
FIG. 6A is a fragmentary transverse sectional view taken upon the line 6A—6A of FIG. 6 upon an enlarged scale as compared to FIG. 6.

The cross board L may be mounted on FIG. 6, as indicated, and located in a desired position by means of the end projections 112, clamp 113 and wing nut 135 as shown on FIG. 6A. This board L will control the spacing between the hot wire H and the end of the porous plastic block which will contact the face 114 of the cross member L.

It will be noted in connection with the turning element K that with elevated blocks of material the upper stylus 81 may also be fitted to cooperate with the lower stylus 109 to control the rotary movement.

In the wiring diagram shown in FIGS. 4 and 6 there is a plug connection 125 which extends through the opening 126 in the rear wall 39 of the casing A.

The conductor elements 127 will lead to the junction box 128 where they are connected to the switch 11 and the signal light 10. The outcoming electrical leads 129 extend to the transformer 130, the output side of which is connected to the electrical connector 49, which leads to the bracket 89 at one end connected to the lower end of the hot wire H and to the arm G at the other end, which connects to the upper end of the hot wire H.

Figure 5:
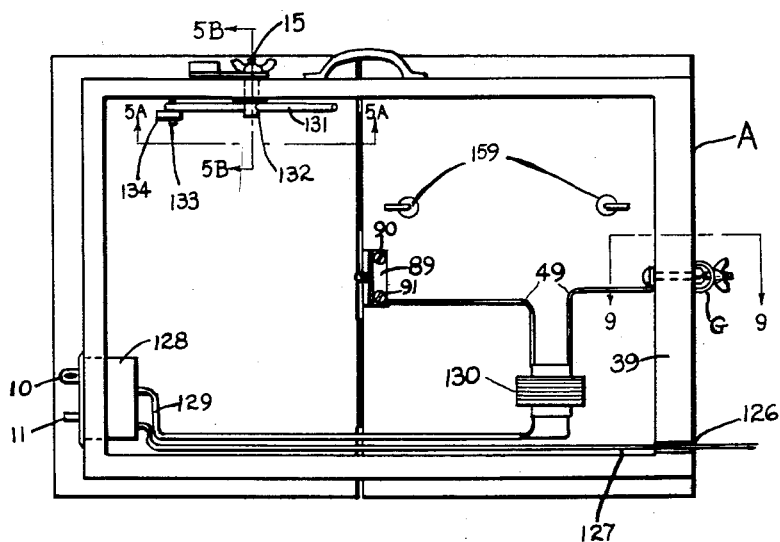
FIG. 5 is a bottom plan view of the case showing the electrical connections and the inclinable adjusting device.
Figure 5A:
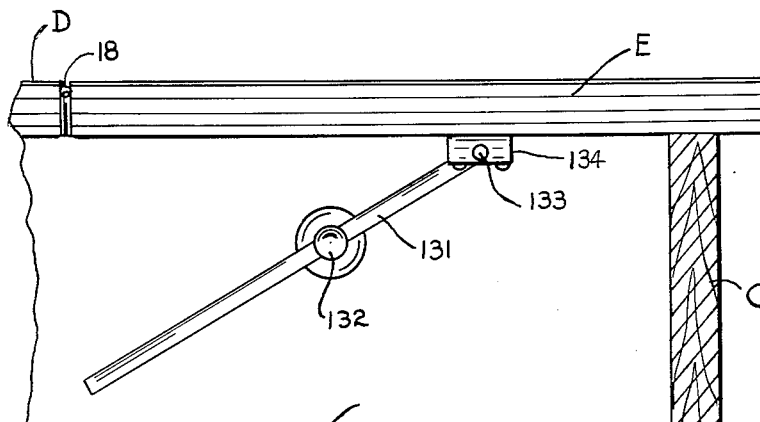
FIG. 5A is a fragmentary transverse vertical sectional view taken upon the line 5A—5A of FIG. 5 upon an enlarged scale as compared to FIG. 5.
Figure 5B:
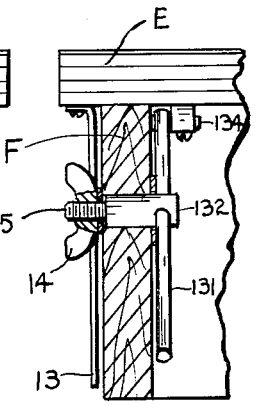
FIG. 5B is a transverse fragmentary sectional view taken upon the line 5B—5B of FIG. 5 upon an enlarged scale as compared to FIG. 5.

Referring to FIGS. 5, 5A and 5B, it will be noted there is provided a supply rod 131 which passes through an opening in the head 132 at the end of the screw 15. The rod 131 has a pivotal connection at 133 to the bar 134, by means of which the swinging table element E may be supported in any desired inclined elevated position.

The operation of the device and the various forms which it is possible to cut are best shown in FIGS. 11 to 20.

In FIG. 11 the cross member L is held in position by the rod 112 carrying the thumb nut 135. The block of material 136 may then be passed laterally through the hot wire H so the cut will take place as indicated at 137, giving a rectangular division of the porous plastic slab 136. With the cross member L removed, free hand guiding at the block through the hot wire H may be accomplished.

In the embodiment of FIG. 12 the table E is inclined upwardly by means of the bar or rod 134, which is locked in an elevated position, as indicated by the arcuate graduating member 13, not shown in FIG. 12 but best shown in FIG. 3.

Then the block or cross bar L may be mounted upon the swinging table element E and held in predetermined position by the thumb nut 135 on the screw 112. Then the slab 138 may be moved laterally across the hot wire H, giving an oblique cut or formation at 139 to the edge of the slab.

As shown in FIG. 13, the slab 140 is mounted upon the turntable or rotary member K upon the cross bar J, and the block of material 140 may be turned so that a circular cut will be made at 141 by the hot wire H, giving a round or circular object. Clockwise rotation of the block of material 140 permits one hand operation.

In the embodiment of FIG. 14 the block of material 142 may be positioned upon the turn device K after the board E has been elevated to a desired inclined position by the bar 134. This will give a series of frustro-conical cuts, as indicated at 143, which will give a series of conical sections, terminating in the final section 144, which may be mounted together to form a conical enclosure.

In the arrangement shown in FIG. 15, the vertical block 145 may be mounted between the stylus 81 and the stylus 109 and turned so as to give a cylindrical shape upon contact with the vertical hot wire H. It will be noted that the styli 81 and 109 are mounted so that they will be one directly above the other in the embodiment of FIG. 15.

In the embodiment of FIG. 16, the table element E will be inclined upwardly, and the styli 109 and 81 will be in an inclined position in respect to each other and offset from the center line of the machine so that the block 146 will receive a paraboloid face or surface 147, as it is passed through the hot wire H.

Figure 17:
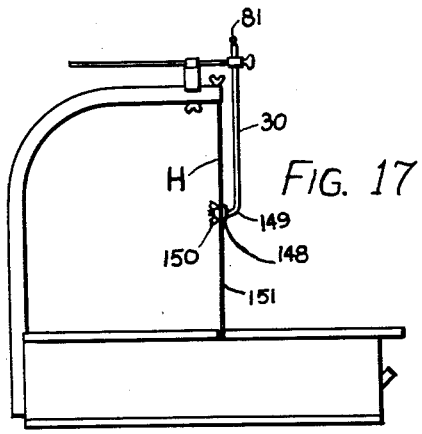

If desired, to make the wire hotter, a short circuit arrangement may be employed, as shown in FIG. 17, with the rod end 149 being substituted in lieu of the stylus end 81 of member 30. This rod end 149 has a right angular turned portion terminating in the thumb nut 150, which clamps on an intermediate portion of the wire H, against clamp nut 148, giving a higher current to the remaining section 151. This will enable a higher rate of cutting since the entire voltage will then be applied to a foreshortened length of the wire H.

Figure 18:
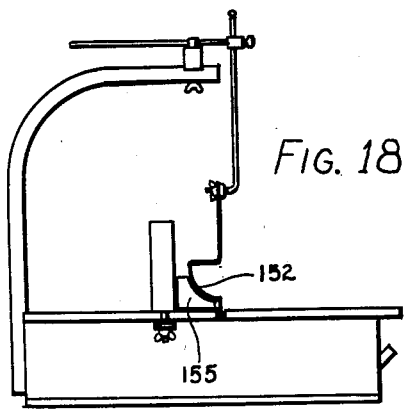
Figure 19:
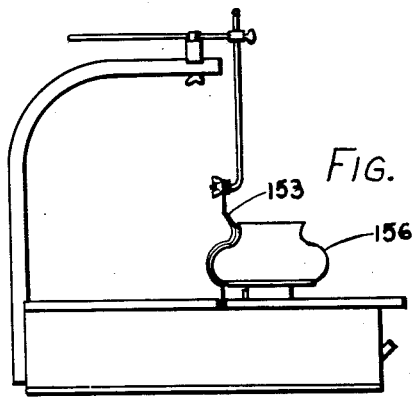

This same arrangement may also be applied to give varying preformed shapes that the wire may have, as indicated at 152 in FIG. 18, 153 in FIG. 19 and 154 in FIG. 20. The shape at 154 is better shown in FIG. 21 where there are 1½ parallel turns.

In 152 there will be an elongated section 155 formed with a curved recess.

In FIG. 19 there will be formed a circular object with a vase-like peripheral surface 156.

In FIG. 20 there will be formed two side members 157 each with a central recess, and the core 158 may be used as a rod. Side members 157 are ideally shaped for covering pipes or tubes which are not to be subjected to temperatures above 120° F.

The L-shaped members 159 as shown in FIG. 5 may be used for carrying electrical conduit wire 127 leading to the plug 125 (see FIGS. 4 and 5).

It is thus apparent that the apparatus as shown may be widely employed to give a tremendous variety of shapes and figures, as may be desired for use by display manufacturers, florists, in and around the home, factory or office, and even for industrial use where special shapes of foam plastic are to be made for filling space for insulation or for other purposes.

The adjustments shown in FIGS. 11 to 20 may be readily made without particular skill or engineering training, and a wide variety of shapes may be achieved either in making models or for various types of lay-outs for industrial, technical, or even instruction purposes. The number of shapes are limited only by the imagination of the operator.

While there has been herein described a preferred form of the invention, it should be understood that the same may be altered in details and in relative arrangement of parts within the scope of the appended claims.

Having now particularly described and ascertained the nature of the invention, and in what manner the same is to be performed, what is claimed is:

1. A hot wire cutting arrangement of the type having a vertical hot wire having top and bottom structural supports permitting the wire to be maintained in taut condition and to be supplied with electric current for a porous plastic block having the properties of foam styrene, having a flat portable rectangular carrier case, one side wall of said case constituting a table for carrying and supporting the arrangement when in use, and said table having a fixed element carrying an adjustable transverse guide bar member and said table also having a swing element hinged to said fixed element and carrying an adjustable transverse base member provided with a rotatable mouth for the plastic block, and said members adjustably mounted on said elements to give the desired shape and size to the porous plastic upon rotary and transverse movement of the plastic across the hot wire and swinging adjustable means for varying the length of the hot wire and the temperature thereof and consisting of a short circuit bar mounted above the upper end of the hot wire and means to swing said bar into contact with an intermediate point on the hot wire and short circuit the same.

2. A hot wire cutting arrangement of the type having a vertical hot wire having top and bottom structural supports permitting the wire to be maintained in taut condition and to be supplied with electric current for a porous plastic block having the properties of foam styrene, having a flat portable rectangular carrier case, one side wall of said case constituting a table for carrying and supporting the arrangement when in use, and said table having a fixed element carrying an adjustable transverse guide bar member and said table also having a swinging element hinged to said fixed element and carrying an adjustable transverse base member provided with a rotatable mouth for the plastic block, and said members adjustably mounted on said elements to give the desired shape and size to the porous plastic upon rotary and transverse movement of the plastic across the hot wire, said hot wire being provided with means to shorten the effective length thereof to increase the wire temperature and thereby increase the cutting speed.

3. A hot wire cutting arrangement of the type having a vertical hot wire having top and bottom structural supports permitting the wire to be maintained in taut condition and to be supplied with electric current for a porous plastic block having the properties of foam styrene, having a flat portable rectangular carrier case, one side wall of said case constituting a table for carrying and supporting the arrangement when in use, and said table having a fixed element carrying an adjustable transverse guide bar member and said table also having a swinging element hinged to said fixed element and carrying an adjustable transverse base member provided with a rotatable mouth for the plastic block, and said members adjustably mounted on said elements to give the desired shape and size to the porous plastic upon rotary and transverse movement of the plastic across the hot wire, and upper and lower rotary stylus members to hold the plastic in a predetermined rotary path and swinging adjustable means for varying the length of the hot wire and the temperature thereof and consisting of a short circuit bar mounted above the upper end of the hot wire and means to swing said bar into contact with an intermediate point on the hot wire and short circuit the same.

4. A hot wire cutting arrangement of the type having a vertical hot wire having top and bottom structural supports permitting the wire to be maintained in taut condition and to be supplied with electric current for a porous plastic block having the properties of foam styrene, having a flat portable rectangular carrier case, one side wall of said case constituting a table for carrying and supporting the arrangement when in use, and said table having a fixed element carrying an adjustable transverse guide bar member and said table also having a swinging element hinged to said fixed element and carrying an adjustable transverse base member provided with a rotatable mouth for the plastic block, and said members adjustably mounted on said elements to give the desired shape and size to the porous plastic upon rotary and transverse movement of the plastic across the hot wire, said guide members to permit lateral movement of the porous plastic in correct relationship to the wire and swinging adjustable means for varying the length of the hot wire and the temperature thereof and consisting of a short circuit bar mounted above the upper end of the hot wire and means to swing said bar into contact with an intermediate point on the hot wire and short circuit the same.

5. A hot wire cutting arrangement of the type having a vertical hot wire having top and bottom structural supports permitting the wire to be maintained in taut condition and to be supplied with electric current for a porous plastic block having the properties of foam styrene, having a flat portable rectangular carrier case, one side wall of said case constituting a table for carrying and supporting the arrangement when in use, and said table having a fixed element carrying an adjustable transverse guide bar member and said table also having a swinging element hinged to said fixed element and carrying an adjustable transverse base member provided with a rotatable mouth for the plastic block, and said members adjustably mounted on said elements to give the desired shape and size to the porous plastic upon rotary and transverse movement of the plastic across the hot wire, one of said adjustable elements having a swinging lever hinged to the table and, when the plastic is moved across the hot wire in lateral or circular motion, beveled or conical shapes, respectively, can be generated and swinging adjustable means for varying the length of the hot wire and the temperature thereof and consisting of a short circuit bar mounted above the upper end of the hot wire and means to swing said bar into contact with an intermediate point on the hot wire and short circuit the same.

6. A hot wire cutting arrangement of the type having a vertical hot wire having top and bottom structural supports permitting the wire to be maintained in taut condition and to be supplied with electric current for a porous plastic block having the properties of foam styrene, having a flat portable rectangular carrier case, one side wall of said case constituting a table for carrying and supporting the arrangement when in use, and said table having a fixed element carrying an adjustable transverse guide bar member and said table also having a swinging element hinged to said fixed element and carrying an adjustable transverse base member provided with a rotatable mouth for the plastic block, and said members adjustably mounted on said elements to give the desired shape and size to the porous plastic upon rotary and transverse movement of the plastic across the hot wire, said table having a plurality of spaced aligned openings and dowel members fixed in said openings to control the spacing of the plastic in respect to the hot wire and swinging adjustable means for varying the length of the hot wire and the temperature thereof and consisting of a short circuit bar mounted above the upper end of the hot wire and means to swing said bar into contact with an intermediate point on the hot wire and short circuit the same.

7. A hot wire cutting arrangement of the type having a vertical hot wire having top and bottom structural supports permitting the wire to be maintained in taut condition and to be supplied with electric current for a porous plastic block having the properties of foam, styrene, having a flat portable rectangular carrier case, one side wall of said case constituting a table for carrying and supporting the arrangement when in use, and said table having a fixed element carrying an adjustable transverse guide bar member and said table also having a swinging element hinged to said fixed element and carrying an adjustable transverse base member provided with a rotatable mouth for the plastic block, and said members adjustably mounted on said elements to give the desired shape and size to the porous plastic upon rotary and transverse movement of the plastic across the hot wire, said table having a swinging base upon which the members may be disassembled and stored to put the case in carrying and transportation condition and swinging adjustable means for varying the length of the hot wire and the temperature thereof and consisting of a short circuit bar mounted above the upper end of the hot wire and means to swing said bar into contact with an intermediate point on the hot wire and short circuit the same.

8. A vertical hot wire cutting and shaping device for cutting and shaping articles from blocks of foam styrene comprising a flat rectangular carrying case, the rectangular top side serving as a table having a fixed end portion and a swinging opposite end portion serving as a mount for the block during cutting and shaping, said swinging portion being hinged along an elongated transversely extending hinge construction transverse of the table, movable adjustable guide bar members extending transversely across each portion of said table on either side of said hinge, a right angular hot wire holder member having a vertical upright portion and a horizontal extension extending over the table transversely toward and above hinge construction, a hot wire connected to the ends of the horizontal extension and extending down into case through said hinge construction and electrical switch connections to the ends of said wire and swinging adjustable means for varying the length of the hot wire and the temperature thereof and consisting of a short circuit bar mounted above the upper end of the hot wire and means to swing said bar into contact with an intermediate point on the hot wire and short circuit the same.

9. The device of claim 8, the bottom side being hingedly connected to one edge of the case transverse to the hinge construction and carrying the bar members, the hot wire and the holder member.

10. The device of claim 8, said horizontal extension having a screw means to take up slack in the wire and also carrying a swinging member to short circuit part of the wire or to serve as a pivot mount for the block upon rotation.

11. The device of claim 8, said table having a plurality of openings and pegs extending along the sides thereof transverse to said hinge connection to fix the position of one of said adjustable bar members.

12. The device of claim 8, said swinging portion having an arcuate guide member and a swinging rod member to fix it in adjusted oblique position.

13. The device of claim 8, one of said bar members having a plurality of openings longitudinally thereof and a turntable device mounted in one of said openings to turn the block in respect to the hot wire.

14. A hot wire cutting machine for porous styrene comprising a vertical hot wire member, a table forming a bottom support for the hot wire and an angle bar forming a top support for the hot wire, and a short circuit bar mounted at the top support, said mounting for said bar consisting of a sliding and swinging element so that the length of said bar and the position of said bar may be varied to contact any desired point on the hot wire.

References Cited in the file of this patent

UNITED STATES PATENTS

| | | |
|---|---|---|
| 432,894 | Parrish | July 22, 1890 |
| 509,534 | Hayne | Nov. 28, 1893 |
| 1,028,529 | Bemis | June 4, 1912 |
| 2,248,057 | Bond | July 8, 1941 |
| 2,310,813 | Sellmeyer | Feb. 9, 1943 |
| 2,465,000 | Turner | Mar. 22, 1949 |
| 2,551,811 | Mueller | May 8, 1951 |
| 2,601,878 | Anderson | July 1, 1952 |
| 2,646,494 | Fegan | July 21, 1953 |
| 2,692,328 | Jaye | Oct. 19, 1954 |
| 2,728,363 | Muehling | Dec. 27, 1955 |
| 2,734,986 | Gameros | Feb. 14, 1956 |
| 2,827,084 | Massongill | Mar. 18, 1958 |